(12) United States Patent
Inata et al.

(10) Patent No.: US 11,106,723 B2
(45) Date of Patent: Aug. 31, 2021

(54) IMAGE DISPLAY DEVICE, IMAGE DISPLAY METHOD AND IMAGE DISPLAY SYSTEM

(71) Applicant: MAXELL, LTD., Kyoto (JP)

(72) Inventors: Keisuke Inata, Tokyo (JP); Yuusuke Yatabe, Tokyo (JP); Nobuaki Kabuto, Tokyo (JP); Nobuhiro Fukuda, Tokyo (JP); Mitsuo Nakajima, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/862,680

(22) Filed: Apr. 30, 2020

(65) Prior Publication Data

US 2020/0257719 A1    Aug. 13, 2020

Related U.S. Application Data

(63) Continuation of application No. 15/536,676, filed as application No. PCT/JP2015/050142 on Jan. 6, 2015, now Pat. No. 10,678,843.

(51) Int. Cl.
*G06F 16/51*    (2019.01)
*G09G 5/00*     (2006.01)
(Continued)

(52) U.S. Cl.
CPC ............. *G06F 16/51* (2019.01); *G09G 3/001* (2013.01); *G09G 5/00* (2013.01); *G09G 5/363* (2013.01);
(Continued)

(58) Field of Classification Search
CPC .......... G06F 16/51; G09G 3/001; G09G 5/00; G09G 5/363; H04N 1/00281; H04N 1/00427
See application file for complete search history.

(56) References Cited

U.S. PATENT DOCUMENTS 7,369,160 B2 *   5/2008   Fujino ................... H04N 5/232
                                                              348/211.3
2005/0105129 A1  5/2005   Takahashi
                          (Continued)

FOREIGN PATENT DOCUMENTS

JP    2002-232954 A    8/2002
JP    2003-242009 A    8/2003
                      (Continued)

OTHER PUBLICATIONS

International Search Report of PCT/JP2015/050142 dated Mar. 31, 2015.
(Continued)

*Primary Examiner* — Sarah Lhymn
(74) *Attorney, Agent, or Firm* — Mattingly & Malur, PC

(57) ABSTRACT

An image display system is configured such that an image display device and an image processing device are connected to each other through a network. The image display device is provided with: an instruction information generation unit for generating instruction information pertaining to image-processing to be performed on an image input signal; an image signal transmission unit for transmitting the instruction information to the image processing device; a corrected signal reception unit for receiving a corrected image input signal obtained through image-processing performed by the image processing device on the basis of the instruction information; and a display signal output unit for outputting an image output signal based on the corrected image input signal, to an object where an image is to be displayed. The image processing device receives the image input signal connected through the network and performs image-processing on the image input signal according to the instruction information.

7 Claims, 15 Drawing Sheets

(51) Int. Cl.
- *G09G 5/36* (2006.01)
- *G09G 3/00* (2006.01)
- *H04N 9/31* (2006.01)
- *H04N 21/2343* (2011.01)
- *H04N 21/485* (2011.01)
- *H04N 21/41* (2011.01)
- *H04N 21/258* (2011.01)
- *H04N 5/225* (2006.01)
- *H04N 5/74* (2006.01)
- *H04N 1/00* (2006.01)
- *H04N 1/327* (2006.01)

(52) U.S. Cl.
CPC ..... *H04N 1/00281* (2013.01); *H04N 1/00427* (2013.01); *H04N 1/32776* (2013.01); *H04N 5/225* (2013.01); *H04N 5/74* (2013.01); *H04N 9/3182* (2013.01); *H04N 9/3185* (2013.01); *H04N 9/3188* (2013.01); *H04N 9/3194* (2013.01); *H04N 21/2343* (2013.01); *H04N 21/25825* (2013.01); *H04N 21/4122* (2013.01); *H04N 21/4854* (2013.01); *G09G 2320/066* (2013.01); *G09G 2320/0626* (2013.01); *G09G 2320/106* (2013.01); *G09G 2340/02* (2013.01); *G09G 2340/0442* (2013.01); *G09G 2370/04* (2013.01); *G09G 2370/042* (2013.01); *G09G 2370/12* (2013.01)

(56) References Cited

U.S. PATENT DOCUMENTS

| 2008/0310510 | A1  | 12/2008 | Hiwasa |
| 2011/0063284 | A1  | 3/2011  | Sudoh |
| 2012/0140029 | A1* | 6/2012  | Yamazaki ............ H04N 13/122 |
|              |     |         | 348/43 |
| 2013/0155113 | A1  | 6/2013  | Kotani |
| 2015/0036944 | A1  | 2/2015  | Restrepo |
| 2015/0156388 | A1* | 6/2015  | Neglur ................. H04N 5/2353 |
|              |     |         | 348/366 |

FOREIGN PATENT DOCUMENTS

| JP | 2004-342003 A | 12/2004 |
| JP | 2004-362055 A | 12/2004 |
| JP | 2005-110148 A | 4/2005 |
| JP | 2005-156964 A | 6/2005 |
| JP | 2006-106158 A | 4/2006 |
| JP | 2008269486 A | 11/2008 |
| JP | 2011-117997 A | 6/2011 |

OTHER PUBLICATIONS

Japanese Office Action received in corresponding Japanese Application No. 2016-568195 dated Sep. 25, 2018 with a partial translation.

* cited by examiner

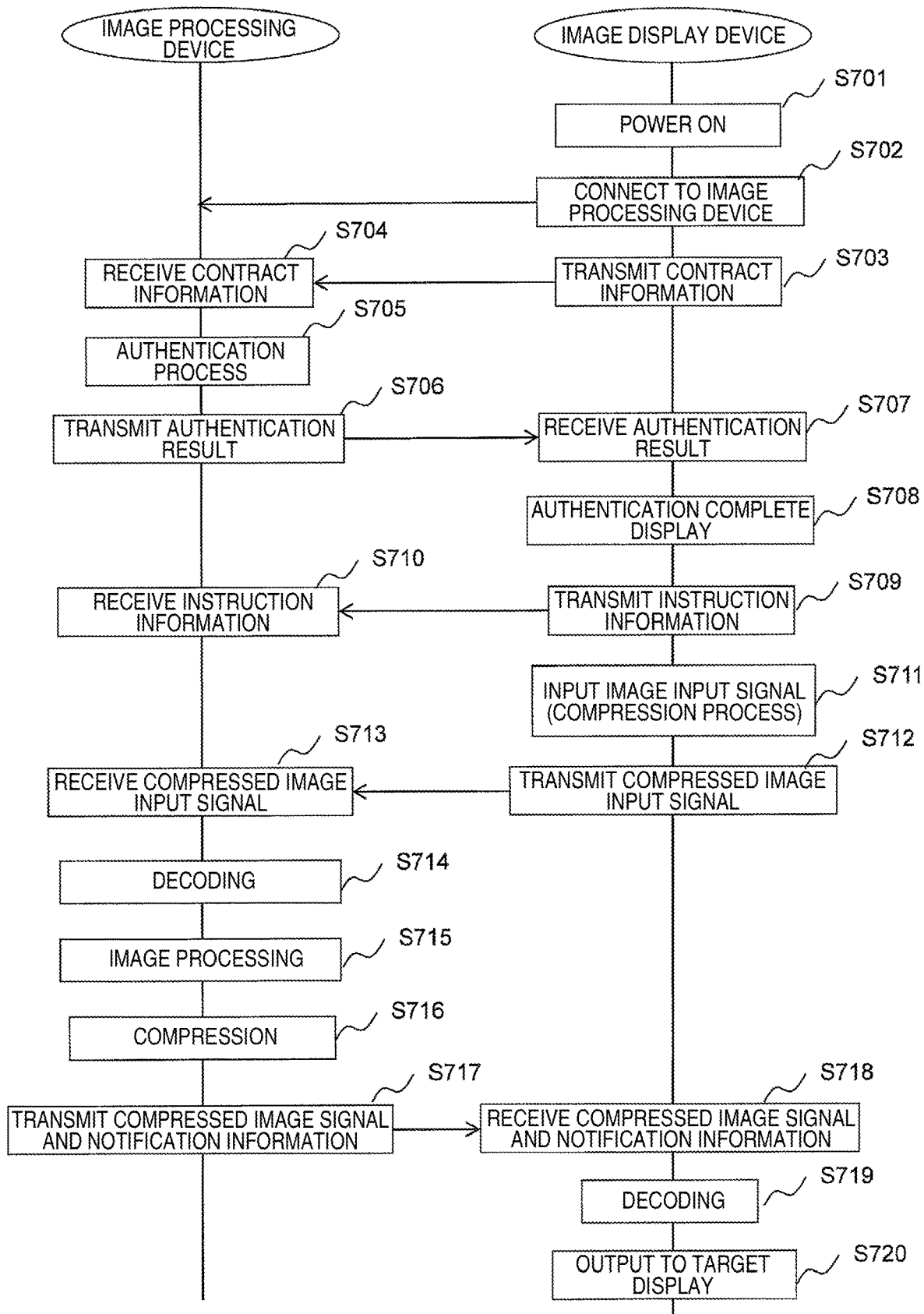

IMAGE DISPLAY DEVICE, IMAGE DISPLAY METHOD AND IMAGE DISPLAY SYSTEM

TECHNICAL FIELD

The present invention relates to an image display device, an image display method, and an image display system that display an image on a monitor and, more particularly, relates to image correction of the image to be displayed.

BACKGROUND ART

As an example of an image correction technique of a projector, Patent Literature 1 discloses a configuration in which "A correction control part outputs a request for read of connection information and a correction parameter to the side of a projector via an input/output control part, when detecting that the projector and a computer are connected. On the side of the projector, a main control circuit properly operates an interface part at a proper timing to output connection information, such as a display format and a correction parameter, such as a shape correction data in a memory, to the side of the computer, in response to request. At an end of the computer, a correction control unit provided therein reads both connection information and the correction parameter via an interface". (citation from abstract).

Further, Patent Literature 2 discloses a configuration in which "A projector device detects a zoom position and an installation angle of a projector to which projection is carried out and sends a result to an image output device. An outputting device corrects the distortion of the image in accordance with the installation angle and corrects the trapezoidal distortion or the like of a display image" (citation from abstract).

CITATION LIST

Patent Literature

PATENT LITERATURE 1: JP 2005-156964 A
PATENT LITERATURE 2: JP 2005-110148 A

SUMMARY OF INVENTION

Technical Problem

In each of Patent Literatures 1 and 2, a projector and a computer are connected and image processing compatible with the projector is performed on image data stored in the computer. In a case that the image processing is complicated and it requires a heavy load, an image processing circuit that can execute the image processing function is needed to be installed in the image display device and this may increase a manufacturing cost of the image display device. This remains a room for a further improvement.

The present invention is made in view of the above problem and has an object to easily generate a high-quality image with a less expensive image display device.

Solution to Problem

To solve the above problem, in the present invention, an image display device and an image processing device are connected via a network. The image display device includes an instruction information generation unit configured to generate instruction information related to image processing to be processed on an image input signal, an image signal transmission unit configured to transmit the instruction information to the image processing device connected via the network, a corrected signal reception unit configured to receive a corrected image input signal which is generated by the image processing device by performing image processing on the image input signal based on the instruction information, and a display signal output unit configured to output, to a target display, an image output signal based on the corrected image input signal. The image processing device includes an image processing unit configured to perform image processing on the image input signal based on the instruction information.

Advantageous Effects of Invention

According to the present invention, a high-quality image can be easily generated with a less expensive image display device. Objects, configurations, and effects in addition to what is described in the above description will be made clear in the following description of embodiments.

BRIEF DESCRIPTION OF DRAWINGS

FIG. 2(a) illustrates the image display device.

FIG. 5(a) illustrates an image in a case that authentication is succeeded; FIG. 5(b) illustrates an image of an authentication error; FIG. 5(c) illustrates an image of a security error; and FIG. 5(d) illustrates an image of a content error.

FIGS. 6(a)-6(d) are diagrams illustrating setting screen examples of image processing in the image processing device. FIG. 6(a) illustrates a setting screen in an initial condition; FIG. 6(b) illustrates a setting screen after a user sets content of image processing; FIG. 6(c) illustrates a setting screen when image processing of a brightness condition adaptation is invalid; and FIG. 6(d) illustrates a setting screen of a brightness condition adaptation.

FIG. 7 is a sequence diagram illustrating an operation of the image display system.

DESCRIPTION OF EMBODIMENTS

Figure 1:
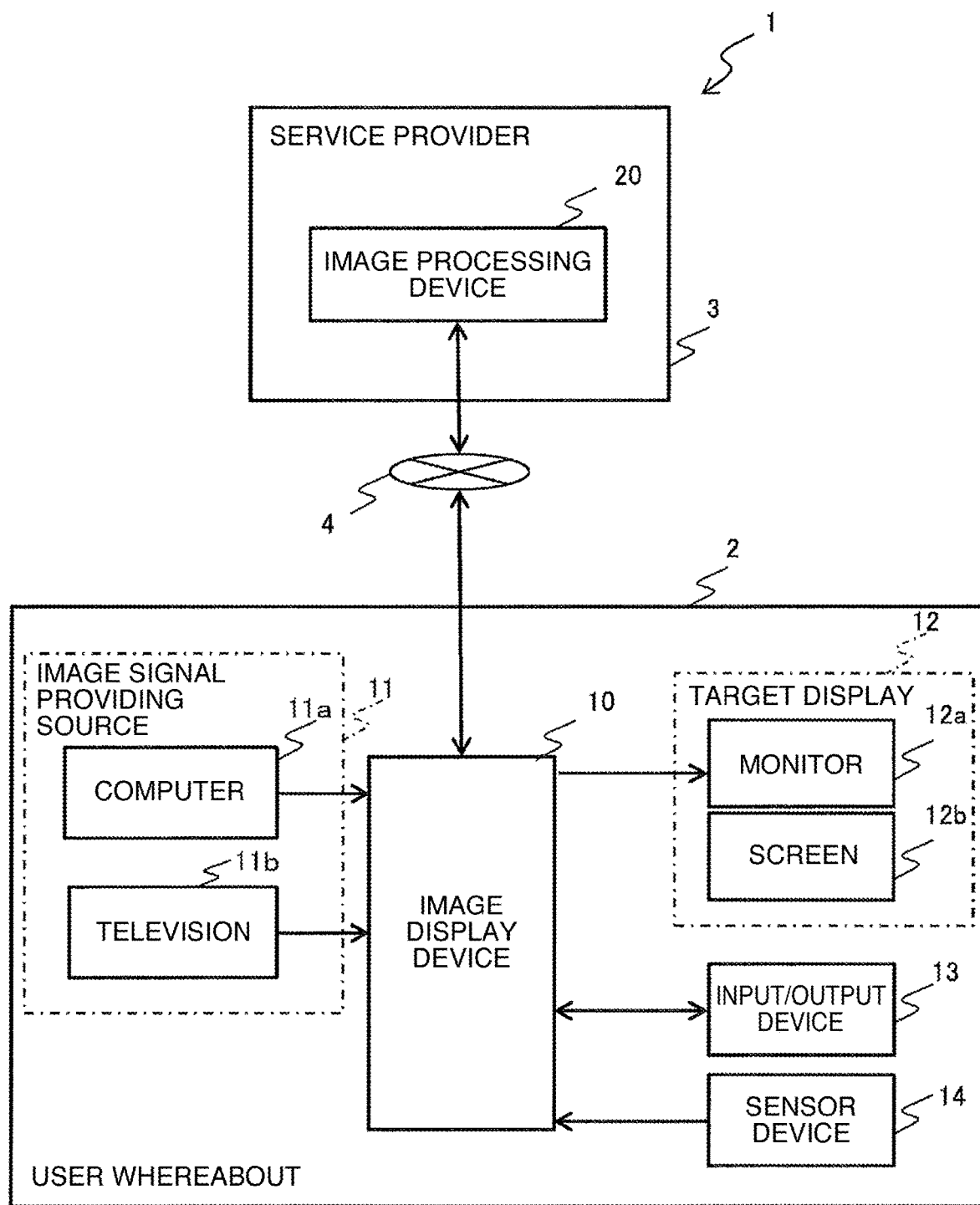
FIG. 1 is a configuration diagram illustrating an example of an image display system according to the present embodiment.

Hereinafter, embodiments of the present invention will be described with reference to the drawings; however, the present invention is not limited to the embodiments. Here, in the drawings to describe the embodiments, same reference numerals are applied to same members and repetition of explanation thereof will be omitted.

First Embodiment

In the following, a first embodiment of the present invention will be described with reference to the drawings. FIG. 1 is a configuration diagram illustrating an example of an image display system according to the present embodiment.

The image display system 1 illustrated in FIG. 1 has a configuration that an image display device 10 located in a place where a user is, such as an ordinary household 2, and an image processing device 20 in a service provider 3 are connected via a public network (hereinafter, referred to as a network) 4 such as the Internet. The image display device 10 is a device that displays an image for a user, such as a projector, a television display device, a mobile phone, a tablet computer, a digital camera, a portable game machine, a vehicle-mounted monitor device, and a recorder for example. Further, the image processing device 20 is a device that performs image processing to improve a quality of the image displayed by the image display device 10, such as an image processing server device, a cloud device, and a computer, which are connected to the network 4.

The image display device 10 is connected to each of image signal providing sources 11 such as a computer 11a and a television 11b (including a connection terminal for a television reception signal of cable television and a satellite broadcasting) for example. Then, an image signal on which a later described correction process has performed is displayed on a target display 12. When the target display 12 is a monitor 12a, the monitor 12a is electrically connected to the image display device 10. The target display 12 may be a screen 12b to which a projection light generated based on an image output signal is projected.

Further, the image display device 10 includes an input/output device 13 including an operation button (corresponding to an input operation unit) to input information, which is related to image processing to be performed on an image input signal, or various setting information and a display panel used to confirm a condition of the image display device 10, and a sensor device 14 that detects information needed to determine content of image processing on the image input signal. The sensor device 14 is an inclination angle detection sensor that detects an installation condition of the image display device 10 such as an inclination angle with respect to a horizontal plane for example, or an illuminance sensor that detects a surrounding environment such as a surrounding illuminance of the image display device 10 or target display 12a.

Figure 2A:
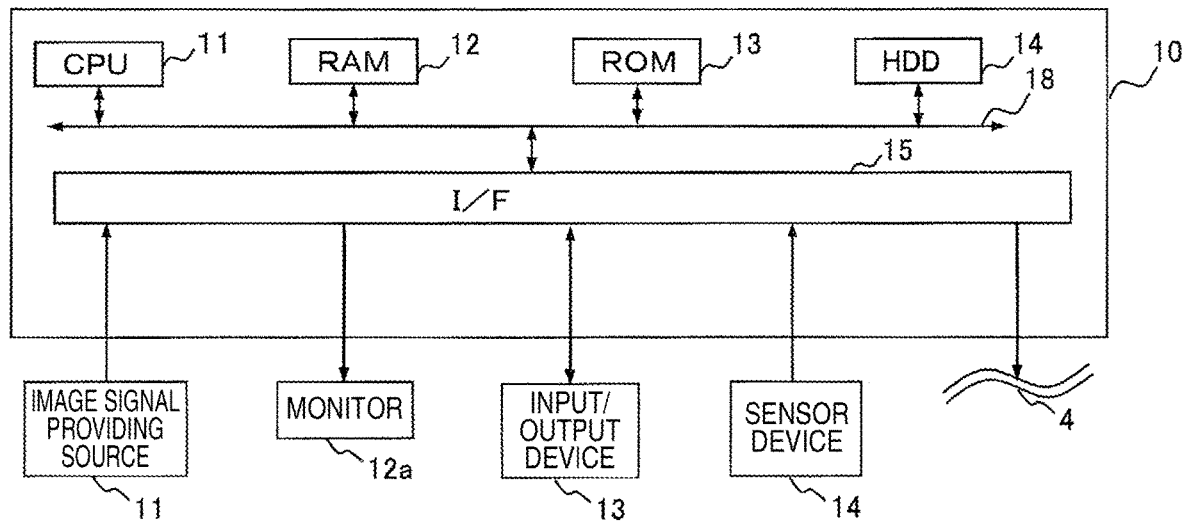
FIGS. 2(a)-2(b) are diagrams illustrating hardware configurations of an image display device and an image processing device.
Figure 2B:
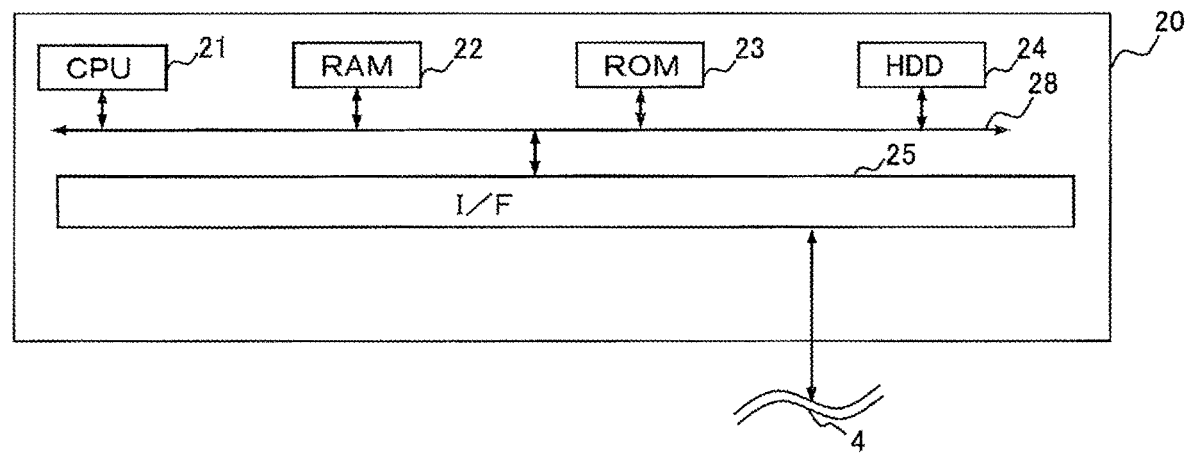

With reference to FIGS. 2(a) and 2(b), hardware configurations of the image display device 10 and image processing device 20 according to the present embodiment will be described. FIGS. 2(a) and 2(b) are diagrams illustrating hardware configurations of the image display device and image processing device. FIG. 2(a) illustrates the image display device; and FIG. 2(b) illustrates the image processing device.

As illustrated in FIG. 2(a), the image display device 10 includes a central processing unit (CPU) 11, a random access memory (RAM) 12, a read only memory (ROM) 13, a hard disk drive (HDD) 14, an I/F 15, and a bus 18. The CPU 11, RAM 12, ROM 13, HDD 14, and I/F 15 are connected to one another via the bus 18.

The image display device 10 is connected to the image signal providing source 11, monitor 12a, input/output device 13, sensor device 14 and the network 4 respectively via the I/F 15.

As illustrated in FIG. 2(b), the image processing device 20 includes a CPU 21, a RAM 22, a ROM 23, an HDD 24, an I/F 25, and a bus 28. The CPU 21, RAM 22, ROM 23, HDD 24, and I/F 25 are connected via the bus 28.

The image processing device 20 is connected to the network 4 via the I/F 25.

Figure 3:
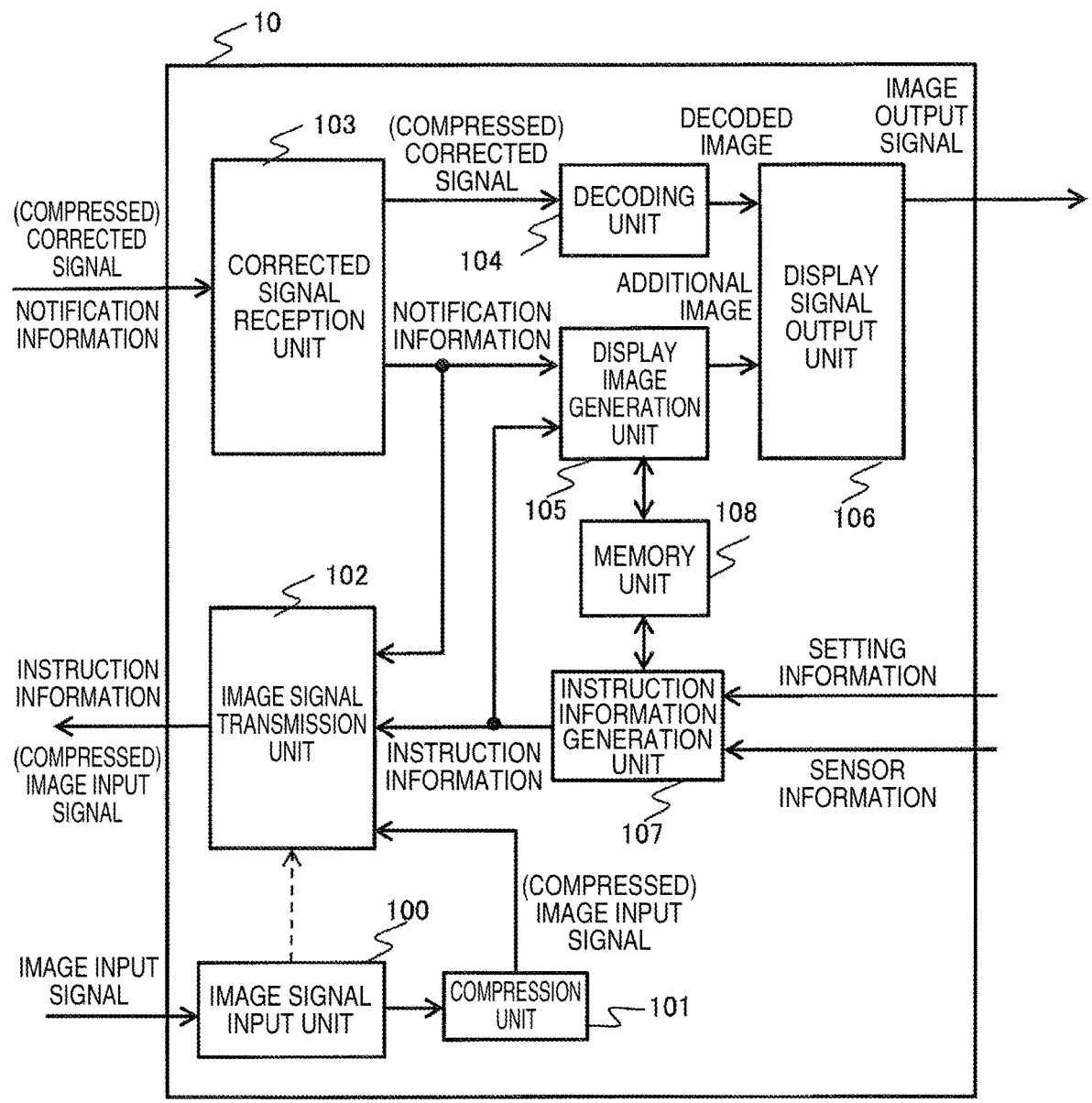
FIG. 3 is a block diagram illustrating a functional configuration of the image display device 10 according to a first embodiment.

Next, with reference to FIG. 3, an internal configuration of the image display device 10 will be described. FIG. 3 is a block diagram illustrating a functional configuration of the image display device 10 according to the first embodiment.

The image display device 10 includes an image signal input unit 100, a compression unit 101, an image signal transmission unit 102, a corrected signal receiving, i.e., reception unit 103, a decoding unit 104, a display image generation unit 105, a display signal output unit 106, an instruction information generation unit 107, and a memory unit 108.

The image signal input unit 100 accepts an input of an uncompressed image input signal (also referred to as an uncorrected image signal) from the image signal providing source 11. More specifically, the image signal input unit 100 is a block to accept an input of the image input signal input from the image signal providing source 11 and transfers the signal to the compression unit 101. As an example of the image input signal, there are a compressed and encoded image signal (HEVC, H.264, MPEG 2, Motion JPEG or the like) and an uncompressed image signal (RGB format, YUV format, or the like).

In a case that a compressed image signal is input, the compression unit 101 may not be needed. Further, even when the compression unit 101 is included, the compressed image input signal may be directly transferred from the image signal input unit 100 to the image signal transmission unit 102 (indicated by the dotted line in FIG. 3).

As an example of the interface to connect the image signal input unit 100 and image signal providing source 11, there are an HDMI (registered trademark), a USB, IEEE 1394, DVI, Ethernet (registered trademark), or the like.

The compression unit 101 is a module that accepts an input of the image input signal from the image signal input unit 100 and performs compression encoding on the image input signal in a data format compatible with the data transmission/reception via the network 4. For example, in a case that the image input signal is an uncompressed image signal, a process to convert the signal into a compressed and encoded image signal is performed.

The image signal transmission unit 102 accepts inputs of an image input signal provided from the image signal input unit 100, instruction information provided from the instruction information generation unit 107, and notification information provided from the corrected signal reception unit 103. Then, the image signal transmission unit 102 determines whether or not an image input signal and instruction information can be output based on the notification information, and outputs the image input signal and instruction information to the network 4 when it is determined that the data can be output. As an example of an interface that connects the image signal transmission unit 102 and corrected signal reception unit 103 to the network 4 respectively, there are an HDMI, a USB, a DVI, IEEE 1394, Ethernet, and the like.

The corrected signal reception unit 103 receives a processed image input signal (hereinafter referred to as a corrected image signal), on which image processing is performed on an image generated by the image processing device 20 by performing image processing on the image input signal based on an instruction signal, and notification information.

The notification information is information provided from the image processing device 20 and information that includes at least one of error information detected during the image processing and a result of authentication between the image display device 10 and image processing device 20.

The corrected signal reception unit 103 outputs the received corrected image signal to the decoding unit 104 and outputs the received notification information to the display image generation unit 105 and image signal transmission unit 102.

The decoding unit 104 is a block that generates a decoded image by decoding the corrected image signal provided from the corrected signal reception unit 103 and outputs the decoded image.

The display image generation unit 105 is a block that accepts an output of the notification information provided from the corrected signal reception unit 103 and the instruction information provided from the instruction information generation unit 107 and generates an additional image based on at least one of the notification information and instruction information.

The display signal output unit 106 accepts an input of the decoded image and additional image and outputs an image output signal to a monitor 12a after performing a compressing process. Under the condition that viewing has been prohibited, when an additional image is input, only such additional image is output as the image output signal.

The instruction information generation unit 107 accepts an input of setting information provided from the input/output device 13 and sensor information provided from the sensor device 14 and generates and outputs instruction information that defines the content of the image processing executed by the image processing device 20. The instruction information may include the setting information and sensor information. The instruction information generation unit 107 may output only predetermined information by extracting from the setting information and sensor information according to an output destination of the instruction information.

The setting information and the instruction information may include a display position, a display size, a transparent level, and the like of the additional image. When the instruction information input to the display image generation unit 105 includes a display position, a display size, and a transparent level, the display image generation unit 105 generates the additional image based on the instruction information.

The memory unit 108 stores various information. For example, the memory unit 108 may temporarily store the setting information, sensor information, and instruction information, or the memory unit 108 may store initial values of the setting information, sensor information, and instruction information in advance. When the setting information and sensor information are not input, the instruction information generation unit 107 may generate the instruction information by using the setting information and sensor information stored in the memory unit 108 or may read and output the instruction information stored in the memory unit 108.

Figure 4:
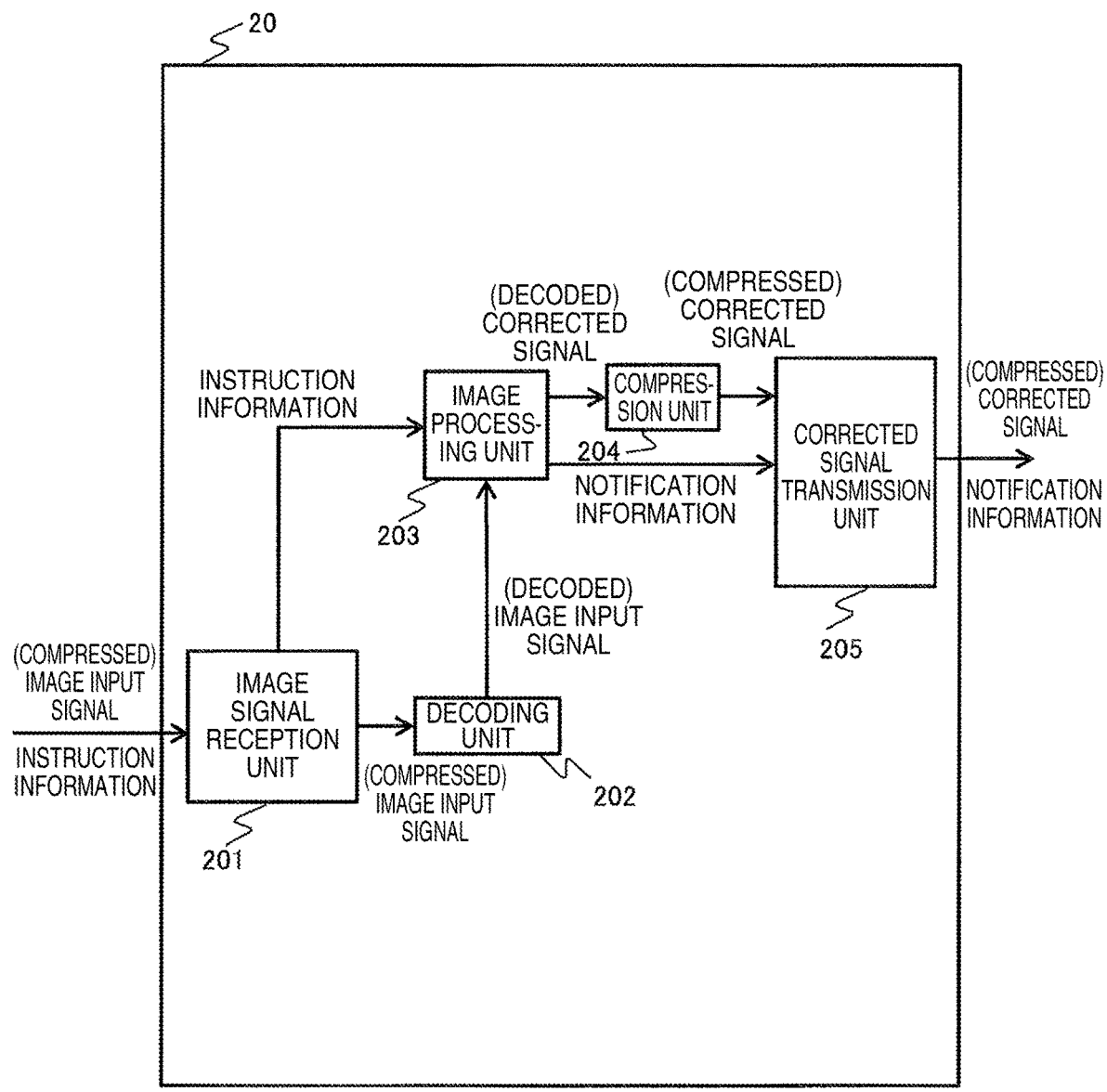
FIG. 4 is a block diagram illustrating a functional configuration of the image processing device.

Next, with reference to FIG. 4, an internal configuration of the image processing device 20 will be described. FIG. 4 is a block diagram illustrating a functional configuration of the image processing device 20.

The image processing device 20 includes an image signal reception unit 201, a decoding unit 202, an image processing unit 203, a compression unit 204, and a corrected signal transmission unit 205.

The image signal reception unit 201 receives a compressed image input signal and instruction information from the image display device 10 via the network 4. The image signal reception unit 201 outputs the compressed image input signal to the decoding unit 202 and outputs the instruction information to the image processing unit 203.

As with the decoding unit 103 in the image display device 10, the decoding unit 202 performs a decoding process on the compressed image input signal and outputs the image to the image processing unit 203.

The image processing unit 203 performs image processing, based on the instruction information, on the decoded image input signal acquired from the decoding unit 203. This process content will be described later. The image processing unit 203 outputs the processed image signal (hereinafter, referred to as a corrected signal) to the compression unit 204.

Further, the image processing unit 203 generates notification information that indicates an error occurred or found during the image processing and outputs the notification information to the corrected signal transmission unit 205.

As with the compression unit 101 in the image display device 10, the compression unit 204 performs a compressing process of the corrected signal with a compression format compatible with the data transmission via the network 4 and outputs the compressed and corrected signal to the corrected signal transmission unit 205.

The corrected signal transmission unit 205 transmits the compressed and corrected signal and/or notification information to the image display device 10 via the network 4.

Figure 5A:
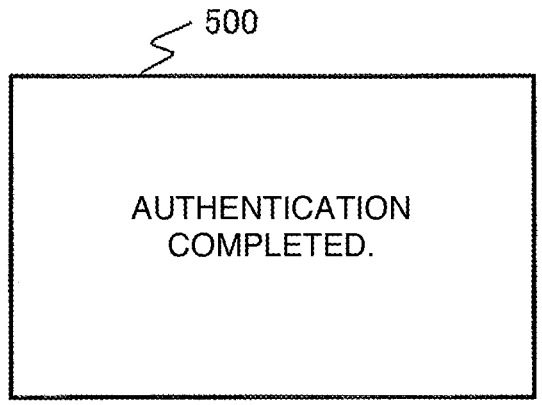
FIGS. 5(a)-5(d) illustrate additional images indicating processing results in the image processing device.
Figure 5B:
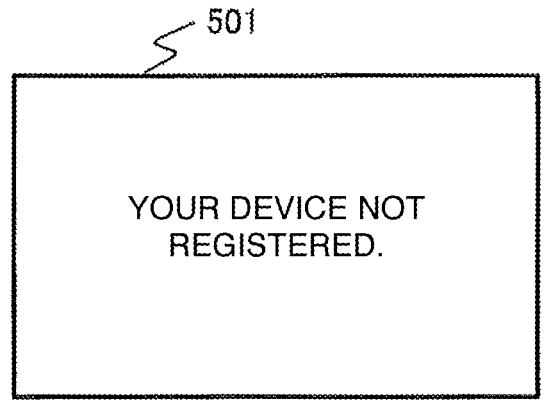
Figure 5C:
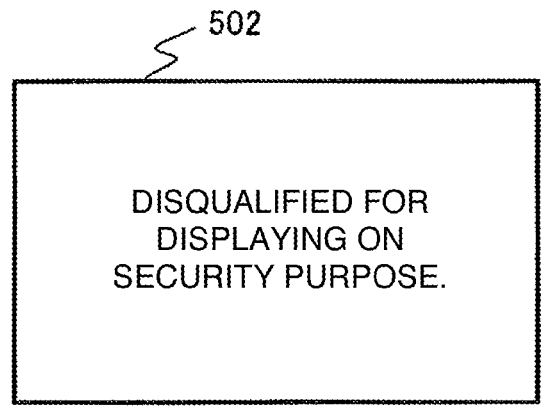
Figure 5D:
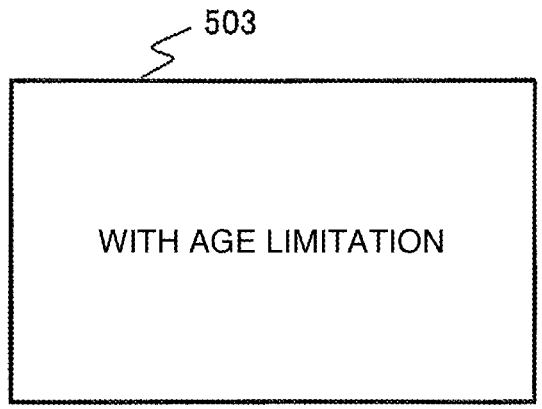
Figure 6A:
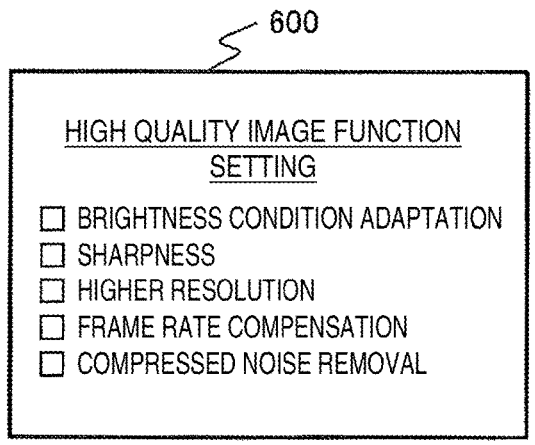
Figure 6B:
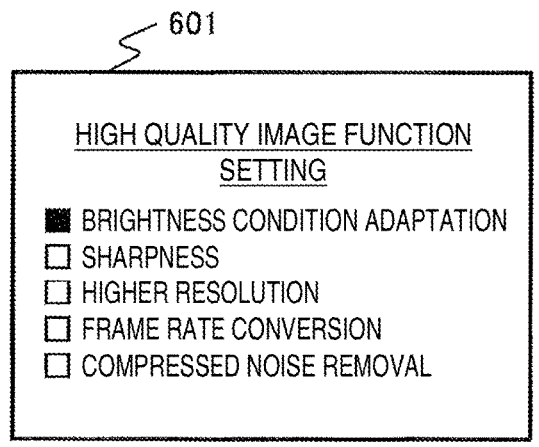
FIG. 6(b) illustrates the image processing device.
Figure 6C:
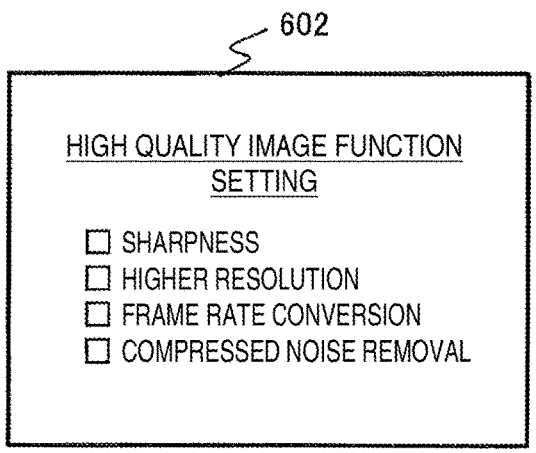
Figure 6D:
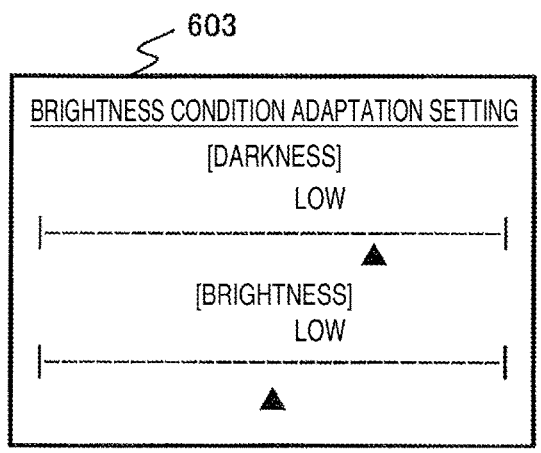

Next, with reference to FIGS. 5(a)-5(d) and FIGS. 6(a)-6(d), additional images displayed on the image display device 10 will be described. FIGS. 5(a)-5(d) are additional images indicating processing results in the image processing device 20. FIG. 5(a) is an image of a case that authentication is succeeded; FIG. 5(b) is an image of an authentication error; FIG. 5(c) is an image of a security error; and FIG. 5(d) is an image of a content error.

An additional image 500 is an example of the additional image which is output when an authentication process between the image display device 10 and image processing device 20 is completed and the connection is allowed (see FIG. 5(a)).

An additional image 501 is an example of the additional image when the connection is not allowed as a result of the authentication process between the image display device 10 and image processing device 20 (see FIG. 5(*b*)). In this example, the additional image 501 is output when the image display device 10 is not registered in the image processing device 20.

The additional image 502 is an example of the additional image when the image processing device 20 determines that the image input signal provided from the image display device 10 cannot be displayed for security purposes (see FIG. 5(*c*)). As a method to determine not to allow displaying for security purposes, copyright protection information or the like included in the image input signal may be used.

An additional image 503 is an example of the additional image when the image processing device 20 determines that the image input signal provided from the image display device 10 conflicts with an age requirement (see FIG. 5(*d*)). As a method to determine whether or not the image conflicts with the age requirement, the age requirement level written in the instruction information and age requirement information included in the image input signal may be checked for example. Here, the age requirement information is information that indicates a range or a lower limit of ages allowed for viewing.

The additional images 502 and 503 correspond to images to be displayed when viewing is not allowed.

The additional images may be temporarily stored in the memory unit 108 or may be stored in the memory unit 108 as an initial value in advance. Further, via the network 4 and corrected signal reception unit 103, the additional images may be downloaded from the image processing device 20 and stored in the memory unit 108. Further, the additional images stored in the memory unit 108 may be read and output.

FIGS. 6(*a*)-6(*d*) illustrate examples of image processing content setting screens as other examples of the additional images. FIGS. 6(*a*)-6(*d*) are diagrams illustrating image processing setting screens of the image processing device 20. FIG. 6(*a*) is a setting image in an initial condition; FIG. 6(*b*) is a setting screen after a user sets the image processing content; FIG. 6(*c*) is a setting screen when image processing of a brightness condition adaptation is invalid; and FIG. 6(*d*) is a setting screen of the brightness condition adaptation.

An additional image 600 is an example of the setting screen of the image processing allowed in the image processing device 20 (see FIG. 6(*a*)).

An additional image 601 is an example of the additional image of a case that the user enables image processing of the brightness condition adaptation via the input/output device 13 on the setting screen displayed on the additional image 601 (see FIG. 6(*b*)).

An additional image 602 is an example of the additional image of a case that the image processing of the brightness condition adaptation is invalid in the image processing device 20 that is, for example, a case that a contract related to this function, which is a contract of the performing image processing for a brightness condition adaptation process between the user of the image display device 10 and the service provider 3 of the image processing device 20 are not concluded (see FIG. 6(*c*)).

An additional image 603 is an example of the additional image illustrating a setting screen of a specific parameter in the image processing including brightness condition adaptation (see FIG. 6(*d*)).

Hereinafter, with reference to FIG. 7, an operation of the image display system according to the first embodiment will be described. FIG. 7 is a sequence diagram illustrating an image display system according to the first embodiment. At the timing that the following process starts, the image processing device 20 has been turned on and is waiting for an access from the image display device 10.

Firstly, the image display device 10 is turned on (S701) and connected to the image processing device 20 via the network 4 (S702).

Next, the image display device 10 transmits contract information to the image processing device 20 via the network 4 (S703). The contract information indicates an agreement related to a type or content of image processing made between the user of the image display device 10 and the service provider 3 of the image processing device 20 (see FIG. 1) and includes information used by the image processing device 20 to recognize the image display device 10 individually. The transmission of the contract information may be performed by the image signal transmission unit 102 by reading the contract information stored in the memory unit 108 (not illustrated).

The image processing device 20 receives the contract information (S704) and authenticates whether to allow connecting to the image display device 10 based on the contract information (S705). The image processing device 20 transmits the authentication result, as the notification information, to the image display device 10 via the network 4 (S706). The reception of the contract information may be performed by the image signal reception unit 201. Then, the image processing device 20 may include an authentication processing unit (not illustrated) and output the authentication result to the corrected signal transmission unit 205.

When notification information indicating a connection permission is received from the image processing device 20 (S707), the display image generation unit 105 in the image display device 10 shows a display of an authentication completion on the monitor 12*a* (S708). As examples of the display on the monitor 12*a*, there are the additional images 500 (see FIGS. 5(*a*)) and 501 (see FIG. 5(*b*)).

The image processing device 20 may output information including a list of contracted image processing as the notification information. The image display device 10 may display the list of image processing available in the image processing device 20 on the monitor 12*a* as the setting screen based on the notification information. As an example of the setting screen, there is the additional image 600 (see FIG. 6(*a*)). The list of the contracted image processing may be stored in the memory unit 108 and the setting screen may be generated.

With the above described procedure, the connection between the image display device 10 and the image processing device 20 can be completed.

Next, the image signal transmission unit 102 in the image display device 10 transmits instruction information that defines the content of the image processing (including a type of the image correction and a target value of the correction) to the image processing device 20 via the network 4 (S709) and the image signal reception unit 201 in the image processing device 20 receives the instruction information (S710).

The instruction information is generated by the instruction information generation unit 107 based on at least one of the setting information provided form the input/output device 13 and the sensor information provided from the sensor device 14. Further, the instruction information generation unit 107 may generate the instruction information by using memory information previously stored in the memory unit 108. As examples of the memory information, there are the setting information and instruction information which are set in a previous process and the setting information, instruction information, and sensor information which are previously set when being initialized.

Further, as examples of the setting information, there are a corrected image signal format, a type or a mode of the image processing, correction level information or a detailed correction parameter in the predetermined image processing, an age requirement level, and the like.

As examples of the corrected image signal format, there are a resolution, a frame rate, and a compression encoding format. As examples of the image processing mode, there are a brightness condition adjustment mode to perform image processing such as a contrast correction according to the brightness around the monitor 12a or image display device 10, a cinema mode, a sport mode, a still image mode, and a text display mode. As examples of the image processing type, there are a contrast correction, sharpness, an edge enhancement, a noise removal, a gamma correction, a color temperature correction, a gradation enlargement correction, a distortion correction, a resolution conversion, a frame rate conversion, and a zooming process. As an example of the correction level information or detailed correction parameter in the predetermined image processing, there is correction level setting of a dark part and a bright part in the brightness condition adaptation mode (see FIG. 6(d)). The image signal format, image processing mode, and image processing type can be set by the user by operating the input/output device 13 on the setting screens (see FIGS. 6(b) and 6(c)) displayed on the monitor 12a of the image display device 10.

As an example of the age requirement level, there is information of an age range to allow displaying the image on the image display device 10. The image processing device 20 compares age requirement information of the image input signal, on which the image processing is performed, and the age requirement level provided from the image display device 10 and transmits information whether or not the age requirement information is within the age requirement range, as the notification information, to the image display device 10. The image display device 10 displays the image on the monitor 12a based on the notification information only when the age requirement information is within the age requirement range indicated by the age requirement level, display corresponding to the age requirement level can be performed without determining whether or not the age requirement information is within the age requirement range in the image display device 10. When the image signal is out of the age requirement range, notification information indicating thereof is transmitted from the image processing device 20 to the image display device 10, and an additional image indicating thereof (see FIG. 5(d)) is displayed on the monitor 12a.

As an example of a method to acquire age requirement information, there is a method to extract age requirement information stored in a user data area of the image input signal on which the image processing is performed. As another example, there may be a method that the image processing device 20 has library information including age requirement range information of various image input signals, and the image input signal provided from the image display device 10 is checked with the library information.

As an example of the sensor information, there is an illuminance level around the monitor 12a and image display device 10.

An image input signal is input to the image signal input unit 100 of the image display device 10 from the image signal providing source 11 (S711). If needed, the compression unit 101 compress the image input signal input from the image signal input unit according to a predetermined encoding method A (S711). Then, the image signal transmission unit 102 transmits the compressed image input signal to the image processing device 20 (S712).

The image signal reception unit 201 of the image processing device 20 receives the image input signal provided from the image display device 10 via the network 4 (S713).

In the following, a case that the image input signal provided from the image display device 10 is an image stream (referred to as a first image stream) on which compression encoding is performed according to a predetermined encoding method (referred to as a first encoding method) will be described as an example. The decoding unit 202 performs a decoding process corresponding to the encoding method A and generates a first decoded image (S714).

Next, the image processing unit 203 performs image processing such as a brightness condition adaptation process or a format conversion on the first decoded image according to the instruction information and generates a corrected second decoded image (S715). As examples of the format conversion, there are a compression encoding process with a format same as that of the image input signal provided from the image display device 10, a compression encoding format written in the instruction information, or a bit rate. Further, before the compression encoding process, a process such as a resolution conversion and a frame rate conversion may be performed.

Next, the compression unit 204 performs a compression encoding process on the second decoded image which is corrected with a format same as that of the first image stream, generates a second image stream, and outputs the second image stream as a corrected image signal (S716).

The compression unit 204 may further output notification information. As an example of the notification information, there is error information of the image input signal detected in the image processing device 20. As examples of the error information, there are information of a failure such as a syntax error and a data corruption detected by the image processing device 20 during the decoding process when the image input signal is an image stream compressed with a predetermined encoding method, and information indicating that the image stream encoding method is not compatible with the image processing device 20.

The corrected signal transmission unit 205 in the image processing device 20 transmits the second image stream and/or notification information to the image display device 10 (S717) and the corrected signal reception unit 103 in the image display device 10 receives the data (S718).

The decoding unit 104 generates a second decoded image by performing a second decoding process on the corrected image signal provided from the image processing device 20 (S719) and the display signal output unit 106 outputs the second decoded image to the monitor 12a (or the target display 12) as an image output signal (S720).

The image display device 10 may output a display related to an occurred error to the monitor 12a, based on the error information.

According to the present embodiment, the image processing device 20, which is connected via the network, performs image processing to improve the image quality of the image to be displayed on the image display device 10. With this configuration, it is not needed to provide a complicated image processing circuit to the image display device 10 and this reduces the manufacturing cost of the image display device 10.

Further, there may be a concern that the consumed power increases to perform advanced image processing; however, according to the present embodiment, since the image processing device 20 performs the image processing, the increase of the consumed power in the place where the image display device 10 is located can be suppressed.

Further, the image processing device 20 connects a plurality of image display devices 10 via a network and can perform image processing in response to a request from each of the image display device 10. Accordingly, when an image processing function is to be updated, since the function only in the image processing device 20 needs to be updated, a problem such that each image display device 10 has a different function update condition may not occur.

Further, the image processing device 20 is configured with a device different from the image signal providing source 11 so that the image input signal can be corrected regardless of the type of the image signal providing source. In addition, regarding the different device conditions of the image display devices 10 or the different display environments including surrounding brightness of a single image display device 10, image correction can be performing according to the display environment of respective timings.

Second Embodiment

The image display device 10 according to a second embodiment has a configuration that the decoding unit of the image display device 10 is modified, regarding the image display device 10 and image display system 1 according to the first embodiment. Hereinafter, same reference numerals are applied to the same members and repetition of the explanation thereof will be omitted.

Figure 8:
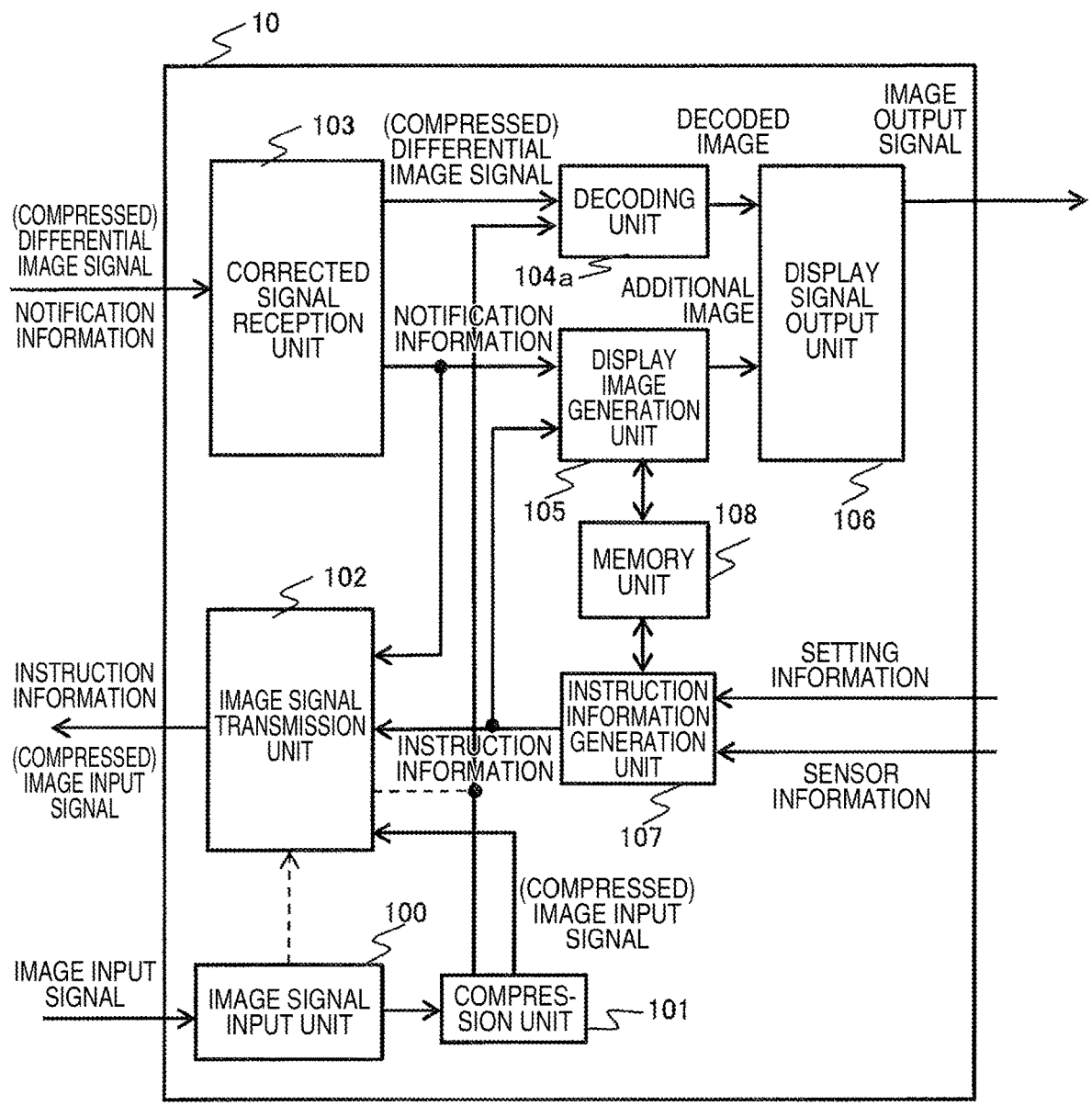
FIG. 8 is a configuration diagram illustrating an example of an image display device according to a second embodiment.

FIG. 8 is a configuration diagram illustrating an example of the image display device 10 according to the second embodiment. Hereinafter, a configuration of the image display device 10 will be described.

A decoding unit 104a is a block that accepts inputs of a corrected image input signal provided from the corrected signal reception unit 103 and an image input signal provided from the image signal input unit 100 and outputs a decoded image. In the following explanation, three manners of the decoding unit 104a including decoding units 104a, 104b, and 104c will be described as examples.

Here, the corrected image input signal is a differential image signal including differential image information between a first decoded image, which is generated in the image processing device 20 and has not been corrected, and a corrected second decoded image. The image input signal provided from the image signal input unit 100 is the same as the image input signal provided to the image signal transmission unit 102. Further, the image input signal provided from the compression unit 101 is the same as the image input signal provided to the image signal transmission unit 102.

Figure 9:
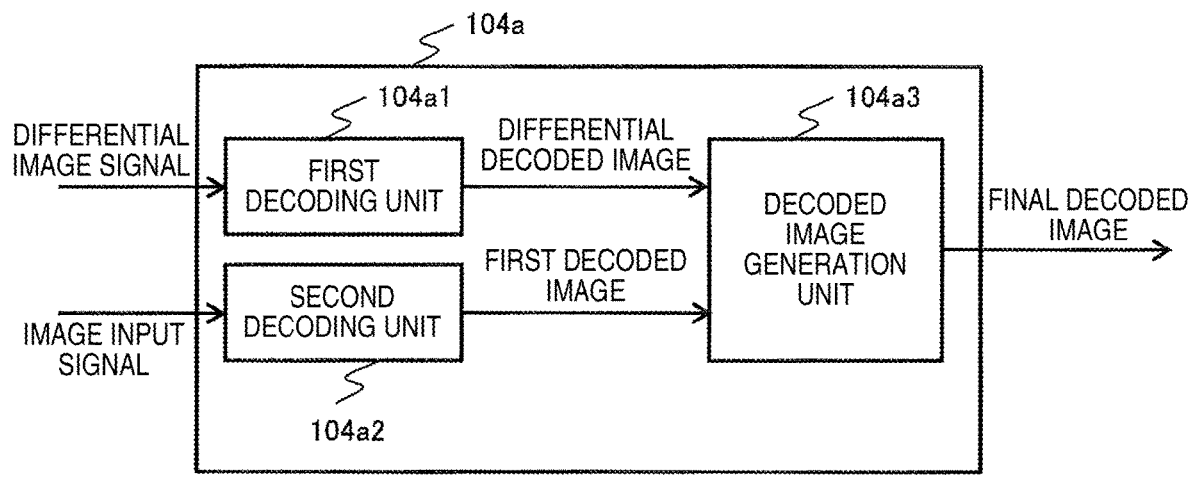
FIG. 9 is a detailed configuration diagram of a decoding unit according to the second embodiment.

FIG. 9 is an example of a detailed configuration diagram of the decoding unit 104a according to the present embodiment. The decoding unit 104a includes a first decoding unit 104a1, a second decoding unit 104a2, and a decoded image generation unit 104a3.

The first decoding unit 104a1 is a block to input a differential image signal provided from the corrected signal reception unit 103 and generate and output a differential decoded image by performing a decoding process on the differential image signal. As an example of the differential image signal, there is a differential decoded image, which is obtained by taking a difference between the pixel values of the first decoded image and second decoded image generated by the image processing device 20 (differential decoded image=second decoded image−first decoded image).

The second decoding unit 104a2 is a block to input an image input signal provided from the image signal input unit 100 or compression unit 101 and generate and output a first decoded image by performing a decoding process on the image input signal.

The decoded image generation unit 104a3 is a block to receive an input of the first decoded image and differential decoded image, generate a final decoded image by adding the differential decoded image to the first decoded image (final decoded image=first decoded image+differential decoded image), and output the final decoded image as a decoded image.

According to the above configuration, a data amount of the corrected image input signal input from the image display device 10 is reduced and the system can be used even when a transmission band of the network 4 is low. This enables to connect more image display devices 10 to the network 4.

Figure 10:
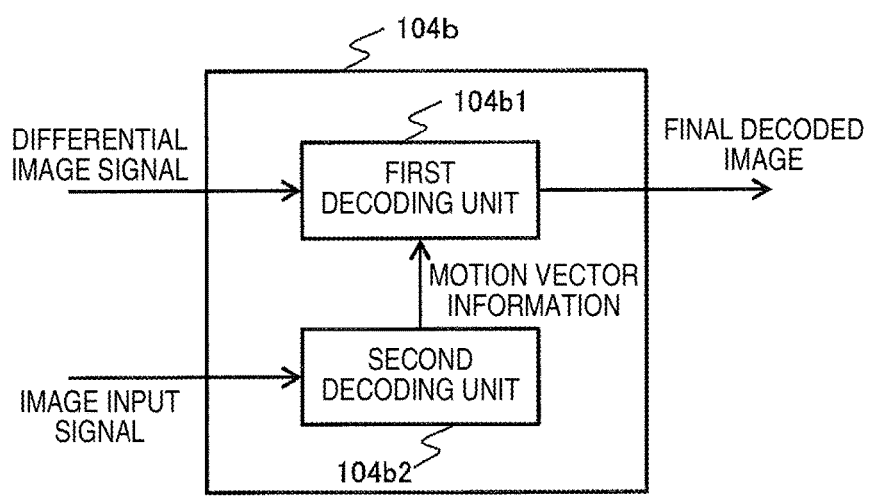
FIG. 10 is a configuration diagram illustrating a configuration of another example of the decoding unit according to the second embodiment.

FIG. 10 is a diagram illustrating a configuration of another example of the decoding unit according to the present embodiment.

The image processing device 20 performs a compression encoding process on the second decoded image by using motion vector information obtained in the decoding process performed on the image input signal to be input, and outputs a signal, which is obtained by removing the motion vector information from the obtained compression encoded image signal, as a differential image signal. That is, the differential image signal is a signal in which the motion vector information is removed from the corrected image input signal generated in a compression encoding process on the second decoded image generated by the image processing device 20.

The decoding unit 104b illustrated in FIG. 10 includes a first decoding unit 104b1 and a second decoding unit 104b2.

The second decoding unit 104b2 is a block to input an image input signal provided from the image signal input unit 100 and output motion vector information by extracting the motion vector information in the decoding process performed on the image input signal.

The first decoding unit 104b1 is a block to input the differential image signal provided from the corrected signal reception unit 103, performs a decoding process on the differential image signal by using the motion vector information provided from the second decoding unit 104b2, and generate and output a final decoded image.

With the above configuration, the data amount of the corrected image input signal input by the image display device 10 can be reduced and the system can be used even when the transmission band of the network 4 is low. Further, this enables to connect more image display devices 10 to the network 4.

Figure 11:
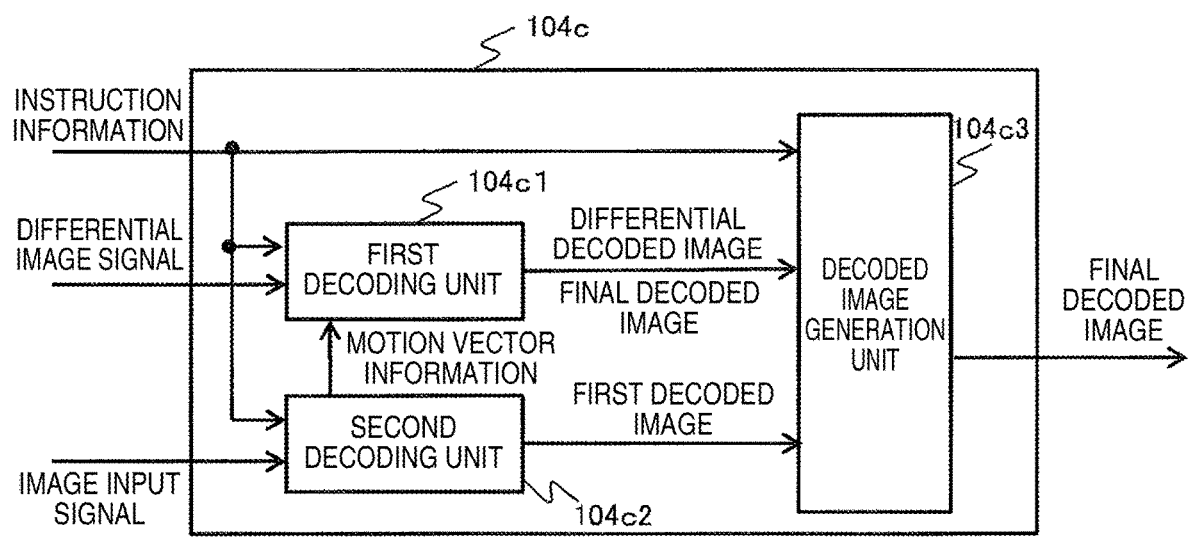
FIG. 11 is a configuration diagram illustrating a configuration of another example of the decoding unit according to the second embodiment.

FIG. 11 is a diagram illustrating a configuration of another example of the decoding unit according to the present embodiment.

The decoding unit 104c of FIG. 11 is compatible with a plurality of differential image signals. In the following, a configuration that enables to switch a process to generate a decoded image of the differential image signal explained in FIGS. 9 and 10 will be described as an example. The decoding unit 104c includes a first decoding unit 104c1, a second decoding unit 104c2, and a decoded image generation unit 104c3.

Although it is not illustrated in FIG. 8, the instruction information generation unit 107 further supplies instruction information to the decoding unit 104, and the decoding unit 104 obtains the instruction information. The instruction information includes differential image signal format information that indicates a type of the differential image signal. Further, to the first decoding unit 104c1, second decoding unit 104c2, and decoded image generation unit 104c3, the instruction information is input respectively.

When the differential image signal format information indicates the format of differential image information illustrated in FIG. 9, the first decoding unit 104c1, second decoding unit 104c2, and decoded image generation unit 104c3 generate decoded images by using the processing method described in FIG. 9.

Further, when the differential image signal format information indicates the format of the differential image information illustrated in FIG. 10, the first decoding unit 104c1 and second decoding unit 104c2 generate a final decoded image by using the processing method described in FIG. 10 and output the final decoded image to the decoded image generation unit 102c3. The decoded image generation unit 102c3 outputs the final decoded image as it is to the display signal output unit 106.

According to the above described configuration, format information of a plurality of types of differential image signals can be processed in one decoding unit.

Third Embodiment

A third embodiment has a configuration that the image display device 10 is a projector. The third embodiment is made to apply the display signal output unit 106 in the image display device 10 to a projector, regarding the image display device 10 and image display system 1 according to the first embodiment.

Figure 12:
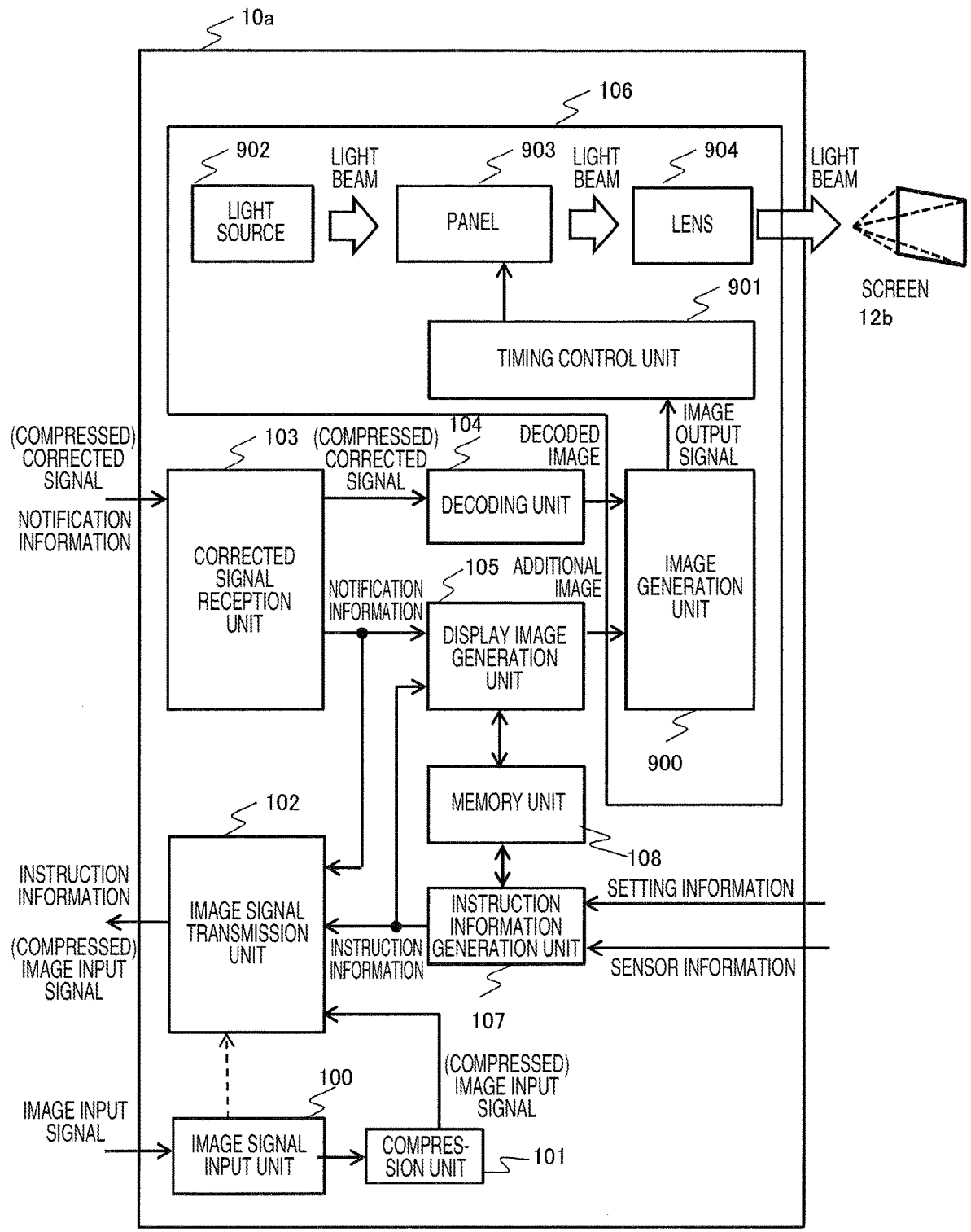
FIG. 12 is a configuration diagram illustrating an example of a projector 10a according to a third embodiment.

FIG. 12 is a configuration diagram illustrating an example of a projector 10a according to the third embodiment. In the following, a configuration of the projector 10a will be described.

The display signal output unit 106 includes an image generation unit 900, a timing control unit 901, a light source 902, a panel 903, and a lens 904.

The image generation unit 900 is a block to input a decoded image provided from the decoding unit 104 and an additional image provided from the display image generation unit 105 and generate and output a display image by compositing the decoded image and additional image.

As an example of the composite process, there is a process to overlap an additional image to the decoded image. When the overlap process is performed, a penetration process such as an alpha blending process may be added. Further, only the decoded image or only the additional image may be output as a display image.

The timing control unit 901 is a block to accept an input of the display image and generate a display control signal based on a horizontal/vertical synchronization signal of a display screen on which the display image is displayed.

The panel 903 is a block to accept an input of a light beam output from the light source 902 and a display control signal output from the timing control unit 901 and generate a projection image by adjusting a tone of the light beam of every pixel.

The lens 904 is a block to project an image on the screen 12b as adjusting a focal point of the light beam which passes through the panel 903.

The image projected on the screen 12b is a high-quality image to which image processing is performed in the image processing device 20.

In a case that the projector 10a is used as an image display device, as an example of the setting information and sensor information, there is an installation condition of the projector 10a with respect to a screen installation face. As an example of the image processing, there are a trapezoidal (keystone) correction, a blur reduction, and a contrast improvement.

In general, a projector projects an image to a screen attached vertically to an installation face such as a table, a wall, or a ceiling for example. In this case, a clear image can be projected on the screen. However, an installing surface of the screen and the installation face of the projector may not be vertical in some cases. For example, although a portable projector can be installed anywhere, the image may be distorted and may not be projected in a rectangular area. The method to adjust the distortion to a rectangular shape is the trapezoidal (keystone) correction. With this correction, the shape is converted to be rectangular by performing a geometric transform operation such as a reduction and an enlargement on the image input signal according to the installation condition of the projector.

According to the present embodiment, regarding the above keystone correction, a keystone correction process can be executed in the image processing device 20 outside the projector 10a so that the cost of the projector can be reduced and the function of the projector can easily be improved.

Fourth Embodiment

Figure 13:
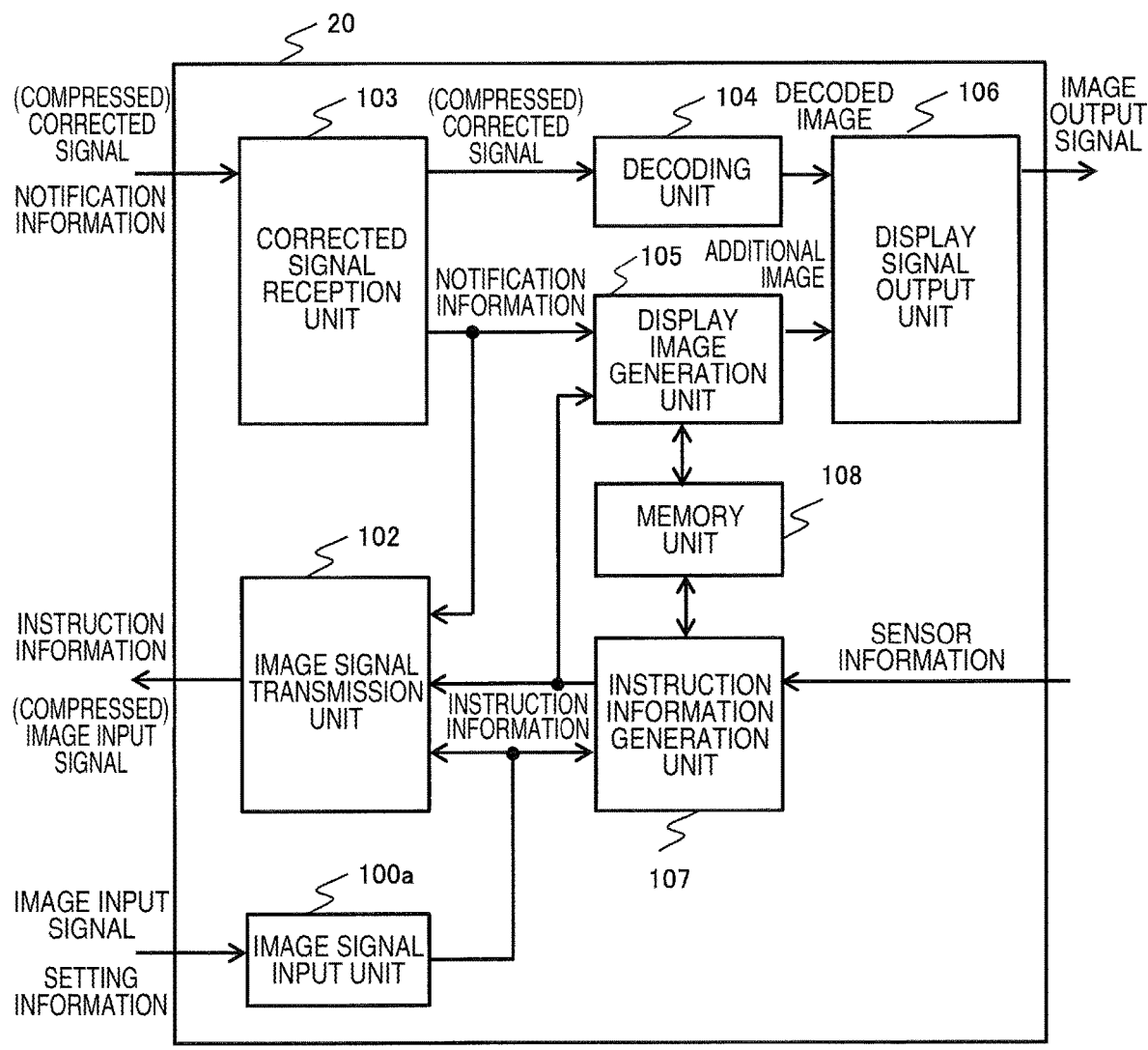
FIG. 13 is a configuration diagram illustrating an example of an image display device according to a fourth embodiment.

The image display device 10 illustrated in a fourth embodiment is an embodiment that includes a computer 11a used as the image signal providing source 11 and an image signal input unit 100a in the image display device 10 receives an image signal and a setting signal from the computer 11a, regarding the image display device 10 and image display system 1 described in the first embodiment. FIG. 13 is a configuration diagram illustrating the image display device 10 according to the fourth embodiment. Here, in the FIG. 13, the compression unit 101 is not illustrated.

The computer 11a is connected to the image display device 10 (see FIG. 1) and outputs an image input signal and a control signal on which the image processing is processed. The image signal input unit 100a accepts an input of the image input signal control signal. Here, since setting information is input via the computer 11a, the input/output device 13 that inputs the setting information in FIG. 1 is not needed in the present embodiment.

With the above describe configuration, the computer 11a that supplies the image input signal can supply and control the setting information to the image display device 10 and image processing device 20.

Fifth Embodiment

The image display system described in a fifth embodiment has a configuration that the transmission method between the image display device 10 and image processing device 20 is changed and a mobile terminal 30 is made enable to supply and control the setting information to the image display device 10 and image processing device 20, regarding the image display system described in the fourth embodiment.

Figure 14:
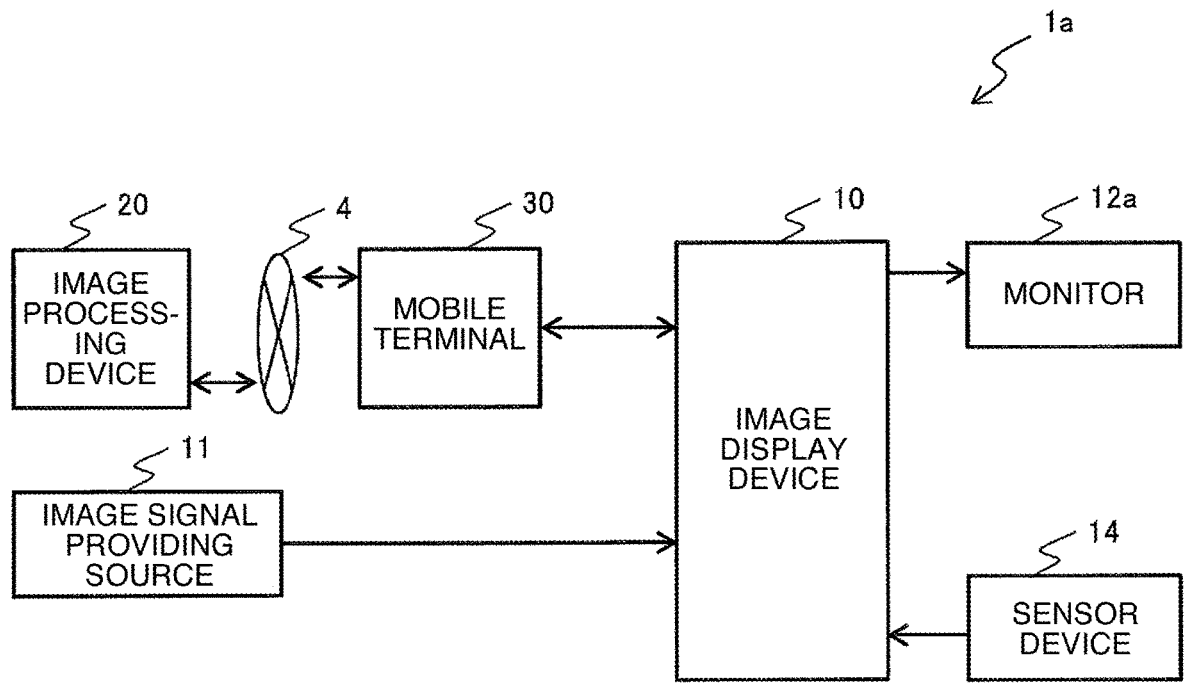
FIG. 14 is a configuration diagram illustrating an example of an image display system according to a fifth embodiment.

FIG. 14 is a configuration diagram illustrating an image display system 1a according to the fifth embodiment. The mobile terminal 30 is a block that transmits and receives various information to and from the image processing device 20 and image display device 10 via the network 4. Further, the mobile terminal 30 is a block to supply setting information to the image display device 10. As an example of the mobile terminal, there are a mobile phone, a tablet computer terminal, and a smartphone.

With the above configuration, even with a data transmission format of the network 4, which is not compatible with the image display device 10, the mobile terminal 30 can convert the data to be compatible with the formant. Particularly, the image display device 10 used in a household often has a long replacement cycle and uses an order version of a latest data communication format or a setting signal; however, the old image display device 10 can be connected and communicate with the image processing device 20 via application software of a mobile terminal device such as a tablet computer and a smartphone. Further, since the setting information can be input to the mobile terminal 30, even when a providing source that cannot be input or output the setting information such as a television and a television signal reception terminal is used as the image signal providing source 11, as with the fourth embodiment, the setting information can be input via a mobile terminal which is a device different from the image display device 10.

Sixth Embodiment

Figure 15:
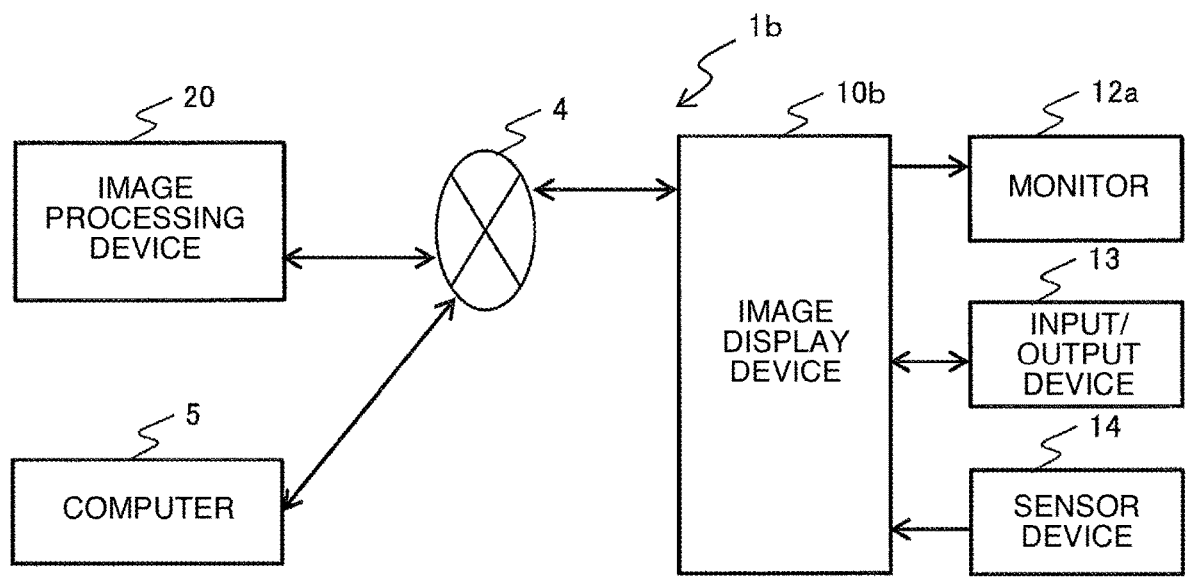
FIG. 15 is a configuration diagram illustrating an example of an image display system according to a sixth embodiment.
Figure 16:
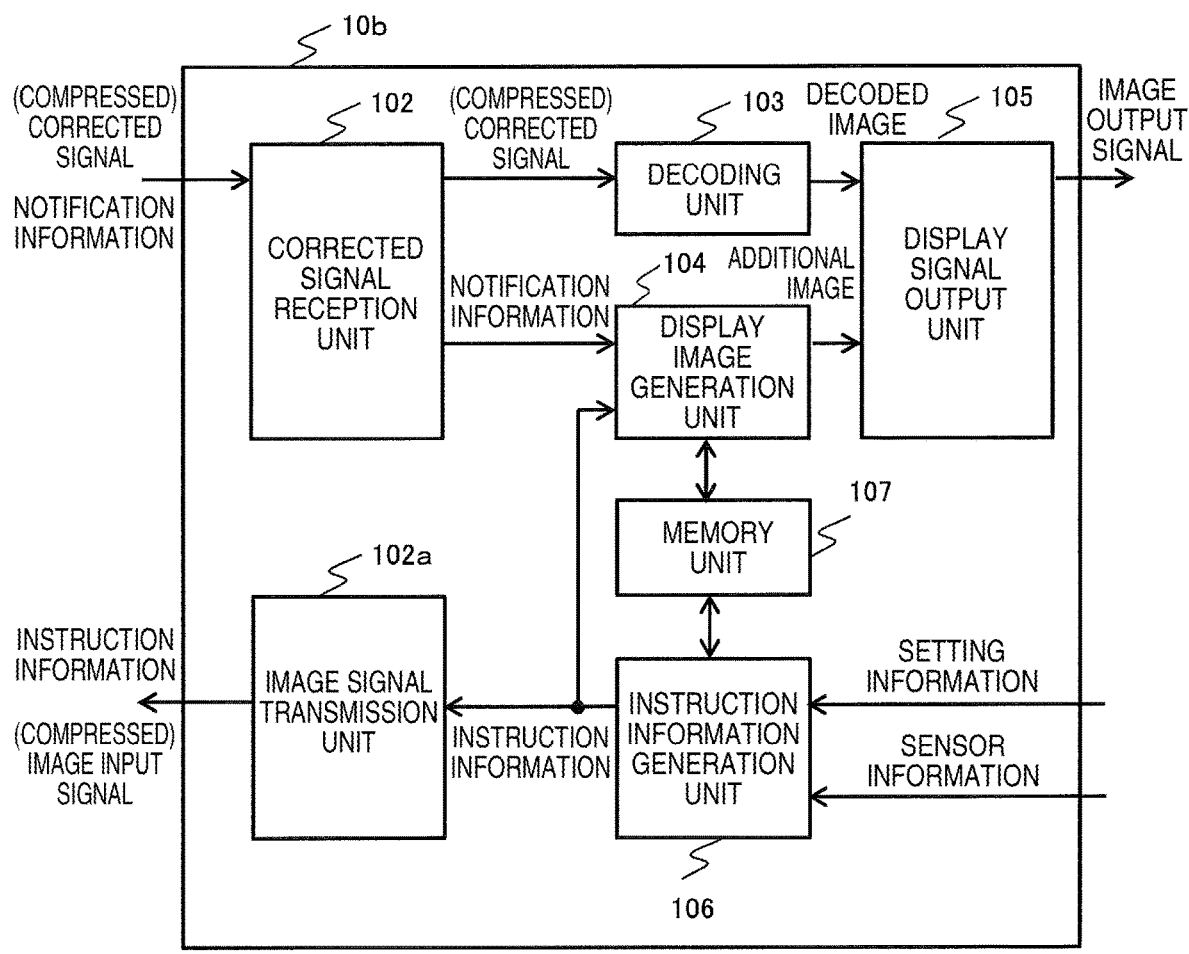
FIG. 16 is a configuration diagram illustrating an example of an image display device according to the sixth embodiment.

An image display system according to a sixth embodiment has a configuration that an image input signal is transmitted to the image processing device 20 from an external device (the computer 5 in FIG. 15) connected to the network 4, regarding the image display system 1 and image display device 10 described in the first embodiment. In the following, an embodiment of the image display system according to the present embodiment will be described. FIG. 15 is a configuration diagram illustrating an example of an image display system according to the sixth embodiment. FIG. 16 is a configuration diagram illustrating an example of the image display device 10b according to the sixth embodiment.

As illustrated in FIG. 15, the image display system 1b described in the present embodiment has a configuration that the image display device 10b, image processing device 20, and computer 5 are connected to the network 4 respectively.

Then, as illustrated in FIG. 16, the image display device 10b has a configuration, in which the image signal input unit 100 and compression unit 101 are not included, different from that of the image display device 10 according to the first embodiment.

In the following, an operation flow of the image display system according to the present embodiment will be described.

The power of the image display device 10b is turned on and connected to the image processing device 20 via the network 4. Here, the processes to connect the image display device 10b and the image processing device 20 is same as the processes in steps S701 to S708 described in the first embodiment and the explanation thereof will be omitted.

Next, the power of the computer 5 is turned on and connected to the image processing device 20 via the network 4. The computer 5 may be an image input signal storage device which is not under the control of the user and, in this case, the computer 5 needs to be tuned on at the timing when the operation according to the present embodiment is started. As an example of a connection process between the computer 5 and image processing device 20, there is a method same as the connection process between the image display device 10 and image processing device 20 described in the first embodiment, which is the processes in steps S701 to S708 for example. That is, it is a method to provide contract information that allows identifying individual computer 5 to the image processing device 20 and the recognition determination is performed in the image processing device 20.

Next, the image display device 10b transmits instruction information of image processing to the image processing device 20 (corresponding to step S709). The instruction information is generated by the image display device 10b based on the setting information provided from the input/output device 13 and sensor information provided from the sensor device 14 and is output.

Next, the image processing device 20 receives the instruction information (corresponding to step S710).

The image display device 10b transmits, to the image processing device 20, image signal acquisition instruction information that instructs so that the image input signal is transmitted from the computer 5 to the image processing device 20. In response to the instruction, the image processing device 20 performs an image input signal transmission request to the computer 5 and the computer 5 transmits the image input signal to the image processing device 20 in response to the request.

Alternatively, the image display device 10b may transmit the image signal acquisition instruction information to the computer 5 and the computer 5 may transmit an image input signal to the image processing device 20 in response to the information.

After receiving an image input signal output permission signal, the computer 5 compresses the image input signal according to need (corresponding to S711) and transmits the image input signal to the image processing device 20 via the network 4 (corresponding to S712). In a case that the image input signal is a compression encoded signal, the compression process may be skipped.

Next, the image processing device 20 receives the image input signal provided from the computer 5, performs a decoding process (corresponding to step S714) and image processing or format converting according to the instruction information (corresponding to step S715), and, after performing a compression process (corresponding to step S716), outputs the image input signal to the image display device 10 as a corrected image input signal (corresponding to step S717).

Next, the image display device 10b receives the corrected image signal provided from the image processing device 20 (corresponding to step S718), performs a decoding process (corresponding to step S719), and outputs the image signal to the target display 12 as an image output signal (corresponding to step S720).

With the above configuration, the configuration of the image display device can be simplified.

As examples of the image display device according to the present embodiment, there are a projector, a television, a recorder, and a set-top box. As examples of the image processing device according to the present embodiment, there are a server device, a cloud device, a computer and the like, which are connected to the network.

Seventh Embodiment

Figure 17:
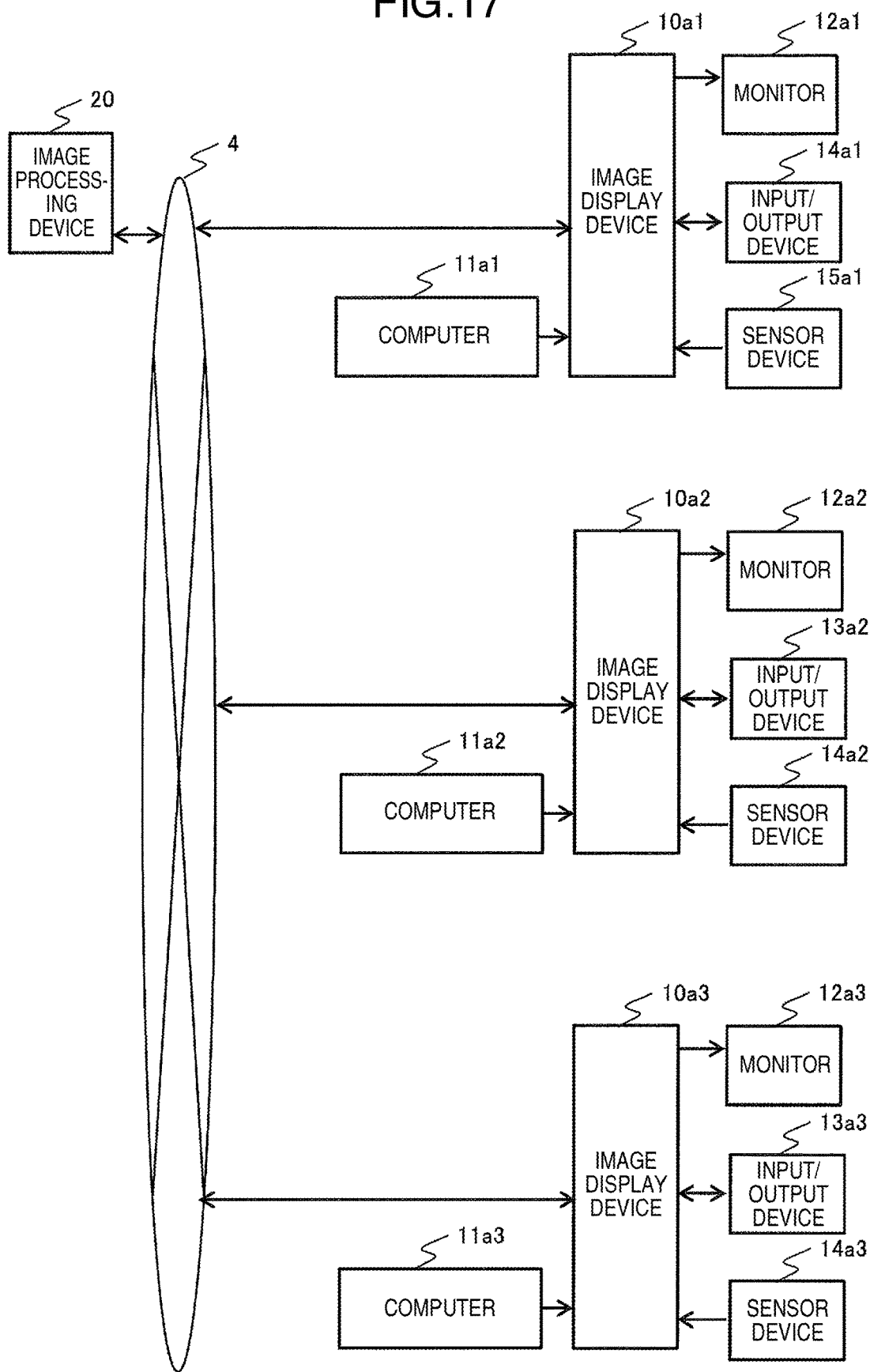
FIG. 17 is a configuration diagram illustrating an example of an image display system according to a seventh embodiment.

An image display system described in a seventh embodiment has a configuration that the image processing device 20 and a plurality of image display devices 10a, 10b, and 10c are connected respectively via the network 4 as illustrated in FIG. 17, regarding the image display system described in the first embodiment. Here, FIG. 17 is a configuration diagram illustrating an image display system according to the seventh embodiment.

With the above configuration, by updating the image processing in the image processing device 20, the update can be reflected to display images output from the plurality of image display devices 10a, 10b, and 10c at the same time.

In the above, examples of embodiments of the present invention have been explained with the first to seventh embodiments; however, the configuration that realizes the technology of the present invention is not limited to the embodiments and various modifications may be applied. For example, a part of the configuration of one embodiment may be replaced with a part of another embodiment, and a configuration of one embodiment may also be added to a configuration of another embodiment. These additions and modifications are all included in the scope of the present invention. Further, the numerical values, messages, and the like described in the specification and drawings are simply examples and the effect of the present invention is not deteriorated even when different numerical values, messages, and the like are used.

A part or all of the above described functions and the like of the present invention may be realized with hardware by designing an integrated circuit for example. Further, the functions and the like may be realized by software that interprets an operation program that causes a micro processing unit or the like to realize the respective functions and the like. The hardware and software may be used in combination.

Further, the control lines and information lines illustrated in the drawings indicate what are needed for the explanation and all control lines and information lines of the product may not be illustrated. In actual, almost all components may be connected to one another.

For example, the image display device illustrated in the above respective embodiments may have a configuration with the projector described in the third embodiment.

REFERENCE SIGNS LIST 1 image display system
4 network
10 image display device
11 image signal providing source
12 target display
20 image processing device

The invention claimed is:

1. An image display device connected to an image processing device, comprising:
an instruction information generator which generates instruction information on an image processing to be performed in the image processing device based on information from a sensor for detecting brightness;
a first image signal receiver which receives a first image signal;
an image signal transmitter which transmits, to the connected image processing device, the instruction information and the first image signal received by the first image signal receiver;
a second image signal receiver which receives a differential image signal between a second image signal and the first video signal, from the image processing device, the second image signal being generated by performing the image processing for the first image signal in the image processing device based on the instruction information; and
a display which displays the first image signal multiplexed with the differential image signal received by the second image signal receiver.

2. The image display device according to claim 1, further comprising an image encoder which compresses the first image signal received by the first image signal receiver,
wherein the instruction information includes a surrounding illuminance for instructing the image processing of the brightness condition adaptation in the image processing device.

3. The image display device according to claim 1,
wherein the differential image signal received by the second image signal receiver is compressed by the image processing device.

4. An image system connected to an image processing device and an image display device via a network,
wherein the image display device includes:
an instruction information generator which generates instruction information for image processing based on information from a sensor for detecting brightness;
a first image signal receiver for receiving a first image signal;
a first image signal transmitter which transmits, to the image processing device, the instruction information including brightness information and the first image signal received by the first image signal receiver;
a second image signal receiver which receives a differential image signal from the image processing device; and
a display which displays an image signal multiplexed with the first image signal and the differential image signal received by the second image signal receiver,
wherein the image processing device includes:
a third image signal receiver which receives the instruction information and the first image signal, output from the image display device;
an image processor which generates the differential image signal between the first image signal and an image signal being performed image processing for the first image signal received by the third image signal receiver based on the instruction information including brightness information; and
a second image signal transmitter which transmits, to the image display device, the differential image signal which is generated by the image processor,
wherein the image processing device obtains information on surrounding brightness around the image display device from the instruction information transmitted from the image display device, and the image processor performs the image processing based on the obtained brightness information.

5. The image system according to claim 4,
wherein the instruction information includes information for making the first image signal sharpness or edge enhancement;
wherein the image processor of the image processing device performs image processing for making the first image signal sharpness or edge enhancement based on the instruction information; and
wherein a second image signal receiver of the image display device receives the differential image signal which is made sharpness or edge enhancement of the image processing performed by the image processor of the image processing device.

6. The image system of claim 4,
wherein the instruction information generator includes a sensor for detecting necessary information for processing of enhancing sharpness or edge.

7. The image system of claim 4,
wherein the image processing device detects necessary information for processing of enhancing sharpness or edge from the first image signal transmitted from the image display device; and
wherein the image processor of the image processing device performs image processing based on the detected information.

* * * * *